Feb. 13, 1945.  L. L. TIRRELL  2,369,326
HIGH PRESSURE MIXING NOZZLE
Filed July 3, 1941
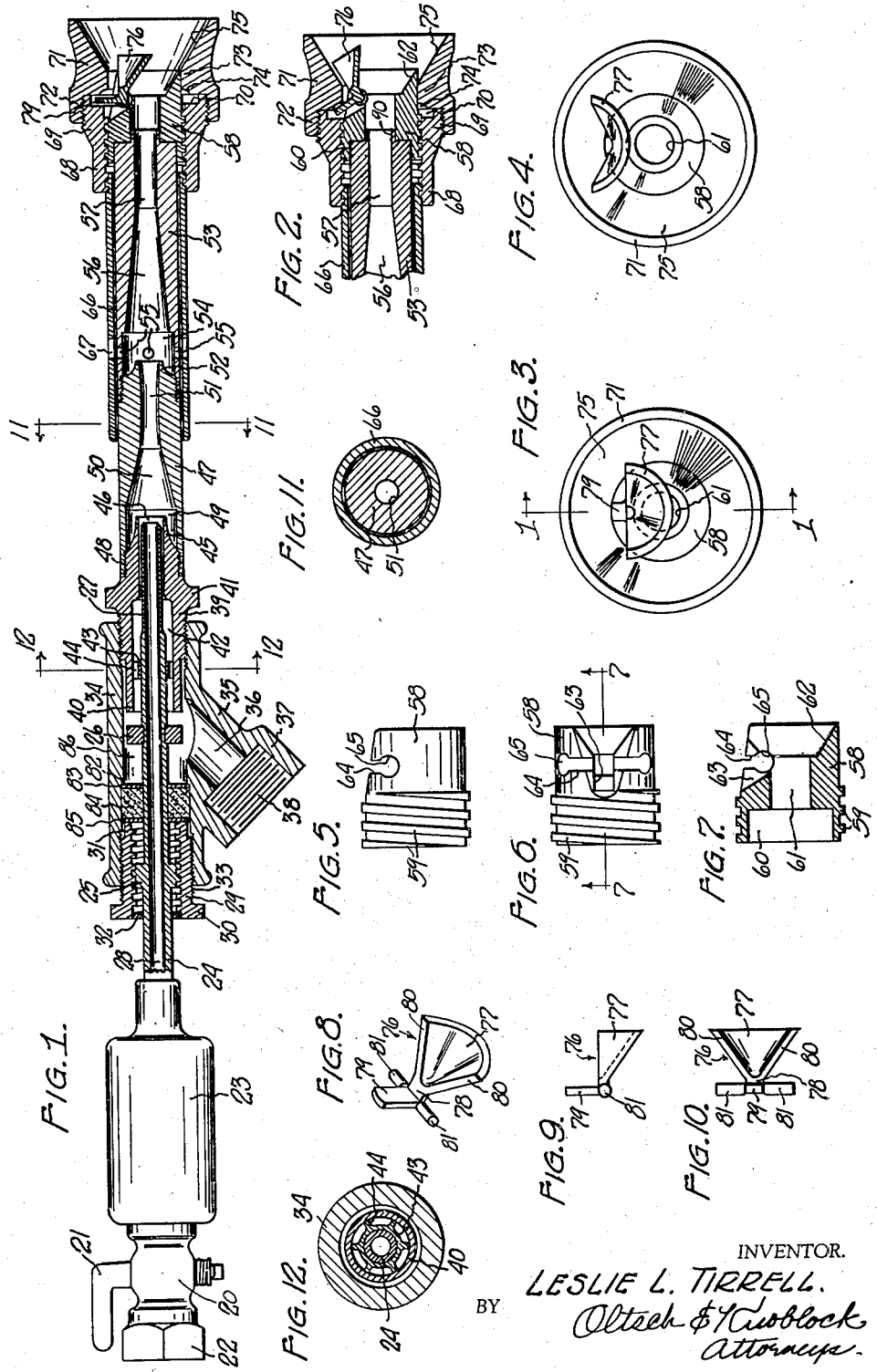
INVENTOR.
LESLIE L. TIRRELL.

Patented Feb. 13, 1945

2,369,326

UNITED STATES PATENT OFFICE 2,369,326

HIGH-PRESSURE MIXING NOZZLE

Leslie L. Tirrell, Benton Harbor, Mich.

Application July 3, 1941, Serial No. 400,898

6 Claims. (Cl. 299—129)

This invention relates to a high pressure mixing nozzle, and more particularly to a nozzle of this character adapted for fire fighting and like purposes.

The primary object of the invention is to provide a nozzle having novel means for controlling the form or pattern and condition of liquid ejected therefrom at high pressure, as between a compact stream of substantially solid cylindrical cross section and long trajectory and a substantially flat sheet or spray or liquid flaring to a substantial width.

A further object is to provide a nozzle having a body, a collar unit rotatably encircling the body, and including an enlarged discharge portion projecting beyond the body, a tubular member threaded in said unit and mounting a baffle tiltable in said discharge portion on an axis transverse of the nozzle, wherein a portion of said baffle engages said collar unit to be tilted thereby upon relative longitudinal movement of said collar and tubular member incident to rotation of said collar unit on said body, for the purpose of controlling the pattern and condition of liquid ejected through said discharge portion.

Other objects will be apparent from the description, drawing, and appended claims.

In the drawing:

Fig. 1 is a longitudinal sectional view of the device taken on line 1—1 of Fig. 3, with parts shown in elevation.

Fig. 2 is a fragmentary detail sectional view corresponding to Fig. 1, but illustrating the discharge baffle in a different adjustment.

Fig. 3 is an enlarged end view of the nozzle with the baffle positioned as illustrated in Fig. 1.

Fig. 4 is an enlarged end view of the nozzle with the baffle positioned as illustrated in Fig. 2.

Fig. 5 is a side elevation of the baffle mounting element of the nozzle.

Fig. 6 is a top view of the baffle mounting element.

Fig. 7 is a longitudinal sectional view taken on line 7—7 of Fig. 6.

Fig. 8 is a perspective view of the baffle element.

Fig. 9 is a side elevation of the baffle element.

Fig. 10 is a top plan view of the baffle element.

Fig. 11 is an enlarged transverse sectional view taken on line 1—1 of Fig. 1.

Fig. 12 is an enlarged transverse sectional view taken on line 12—12 of Fig. 1.

Referring to the drawing, which illustrates a preferred embodiment of the invention, the numeral 20 designates a valve controlled by handle 21 and connected to a liquid line at 22. Tubular part 23 connected to the valve forms a handle. An elongated tube 24 projects from tubular part 23 and has a threaded enlargement 25 and a valve 26 formed thereon in spaced relation intermediate its ends. The end portion 27 of tube 24 is of reduced outer diameter, but the bore 28 of said tube is uniform throughout.

An externally and internally threaded tubular member 29 is threaded on enlargement 25 of tube 24. Member 29 has a flange 30 and an annular guide 32 at its outer end and a reduced thickness inner end portion 31. Member 29 is threaded at 33 in the body 34 of a fitting having a branch 35 intermediate thereof. Branch 35 has a bore 36 smaller than the bore of body 34, and its outer end 37 is enlarged and screw threaded at 38 for connection with a high pressure line. Rearwardly of branch 35, the fitting 34 receives a gasket 84 between metal rings 83 and 85. Sleeve 29 presses these parts against shoulder 82 and radially compresses the gasket to form a seal.

A jet 39 is threaded in the outer end of branch fitting 34 with its inner tubular end portion 90 terminating forwardly of branch bore 36 and its bore 44 receiving tube 24 with substantial clearance. A spacer sleeve 43 having outer longitudinal ribs 44 centers tube 24 in bore 42. The forward end of jet 39 has a reduced Venturi bore 46 receiving tube portion 27 with clearance, and is tapered externally at 45.

A second jet 47 is screw threaded on jet 39 at 48. Jet 47 has a large diameter bore portion 49 receiving jet end 45, a tapering intermediate bore portion 50, and an elongated reduced Venturi bore 51. The front of jet 47 is tapered externally at 52.

A cylindrical member 53 is screw threaded at bore portion 54 to the front of jet 47. Circumferentially spaced openings 55 are formed in member 53 at bore 54. The intermediate portion 56 of the bore of member 53 tapers forwardly, and the bore terminates in a reduced substantially cylindrical portion 57. Member 53 terminates in a reduced diameter portion 90.

A cylindrical socket member 58 is fixedly mounted on end portion 90 of the cylindrical member 53. Socket member 58 is of the construction best illustrated in Figs. 5, and 6 and 7, and has a fast external screw thread 59 at its inner end portion. Socket 58 has a large cylindrical bore 60 at its inner end rotatably receiving the front portion of member 53. The intermediate portion 61 of the bore of socket 58 has a drive fit on or is otherwise fixed on the reduced end portion 90 of member 53. The bore portion 61 of member 58 communicates with flaring mouth opening 62. Member 58 has a longitudinal radial slot 63 formed in the forward end thereof and terminating intermediate its ends. A pair of aligned transverse slots or grooves 64, having enlarged inner end portions 65 are formed in the portions of member 58 on opposite sides of and adjacent the inner end of longitudinal slot 63. Cylindrical inner groove portions 65 are positioned with their common axis substantially spaced from the axis of the member 58, as best illustrated in Figs. 5 and 7.

An elongated sleeve 66 loosely encircles the cylindrical member 53 and the front end of jet 47 and preferably has an inner diameter slightly greater than the outer diameters of member 53 and jet 47. Sleeve 66 is of a length to form an elongated hand grip, and its external surface is preferably knurled. Sleeve 66 extends rearwardly beyond the openings 55 in member 53, and has a plurality of circumferentially spaced elongated openings 67 therein adapted to register with said openings 55. The clearance between sleeve 66 and member 53 accommodates passage of air to openings 55 if sleeve openings 67 do not register therewith.

Upon the forward end of sleeve 66 is secured a collar 68 which is internally screw threaded to mate with the threads 59 upon the socket member 58. The forward end of collar 68 is enlarged at 69, and the front transverse face of member 68 is recessed at 70.

A nozzle mouth element 71, having a rear tubular internally screw threaded portion 72, is threaded upon the enlarged forward portion 69 of the collar 68. Mouth element 71 has an intermediate thickened portion 73 providing a reduced diameter bore in which the cylindrical front portion of socket 58 is adapted to having a sliding and relatively rotatable fit. The rear end of thickened portion 73 is preferably cut away or tapered at 74, for purposes to be hereinafter set forth. The forward end of the mouth element has a conical mouth opening 75 flaring outwardly from the forward end of the cylindrical bore in the intermediate portion of the element. The taper of the opening 75 is preferably complementary to the taper of the forward flaring mouth 62 of the bore of socket member 58, whereby, when the parts are arranged as illustrated in Fig. 1, the conical mouths form continuations of each other and provide an elongated conical mouth opening which serves to form an eddy chamber to prevent dripping of liquid therefrom.

A baffle member 76, best illustrated in Figs. 8, 9, and 10, is adapted to be carried by the socket member 58. Member 76 comprises a body portion 77 of transverse concave-convex form and tapered from one end to another, whereby its shape is similar to one portion of a hollow cone divided along a plane coinciding with and parallel to its axis, and defining longitudinal edges 80. At the small dimension end of body member 77 is provided a neck 78 from whose end projects a tongue 79 extending perpendicular to the plane of the edges 80 of the body member 77. A pair of elongated aligned pins 81 project from opposite sides of the neck 78. Pins 81 extend perpendicular to the tongue 79 and to the axis of the member 77. The neck 78 fits in the slot 63 of socket 58, and the pins 81 seat rotatably in the cylindrical groove portions 65 of said socket. The semi-conical body portion 77 of the baffle projects forwardly from socket 58 and is positioned within mouth opening 75 of member 71. Tongue 79 is of a length sufficient to extend into the recess 70 in the face of the collar 68, as best illustrated in Figs. 1 and 2.

In the use of the device the internally threaded collar 22 on the valve 20 is connected with a line from a source of one liquid under comparatively low pressure, and a line from a source of a second liquid under much higher pressure, is connected at threaded portion 38 of the branch fitting. The two liquids pass through the mixing chamber 49 and tapered chamber 50 at high velocity, and are effectively, quickly and completely mixed. A double suction effect occurs at the interfitting jets 27 and 46 and at the venturi 51, respectively, and hence the proportion in which the two liquids are mixed remains substantially constant for any given adjustment or setting of the nozzle.

The proportion in which the two liquids are to be mixed may be varied by adjusting the position of valve 21 relative to the end of tubular portion 40 of jet member 39.

Air is drawn into the bore of the outer cylindrical member 53 through openings 55 and 67, in member 53 and sleeve 66, respectively, at a point adjacent the mouth of jet 52.

Assuming that the nozzle is set in the position illustrated in Fig. 1, when liquid mixture is discharged from the bore of member 53, it passes through the cylindrical bore 61 of socket 58 and strikes the convex tapered face of the baffle member 77. The shape of the baffle member, together with the shape of the tapered mouth openings 62 and 75 of the socket 58 and mouth element 71, respectively, produces a discharge of the liquid in a substantially flat sheet form diverging from the mouth of the nozzle. By introducing a pressure of around 600# at branch 35, I have found that the flat sheet of liquid discharged by the nozzle at this nozzle setting will have a width of approximately 10 feet at a distance of from 10 to 15 feet from the nozzle. This setting of the nozzle is important when fighting smoldering fires covering large areas, such as fires in scrap and rubbish piles, and deep fires in coal piles caused by instantaneous combustion.

Assuming that the nozzle is to be used on a fire which is in open flame and from which a much higher degree of heat is generated, it is necessary to adjust the nozzle to a position as shown in Fig. 2. This is done by simply rotating the sleeve 66 relative to the member 53 which it encircles, thereby longitudinally and forwardly moving the sleeve and its associated parts relative to socket 58 by virtue of the threaded connection of said socket with said collar 68. This longitudinal movement of sleeve collar 68 and mouth 71 shifts the upper end of tongue 79 extending in the recess 70, thus effecting tilting of the baffle to the position illustrated in Fig. 2. Note that the tilting of tongue 79 is accommodated by the taper 74 of the mouth element. In its Fig. 2 position, the baffle 76 is entirely clear of a longitudinal projection of the cylindrical bore 61 of the socket member 58, whereby a solid stream may be projected from the mouth of the nozzle without interference from the baffle member. Such a solid stream of water may be projected for distances of 60 feet or more under the pressure aforementioned.

It will be obvious that the nozzle may be adjusted to any position between the positions illustrated in Figs. 1 and 2, to meet specific conditions intermediate the two extremes above described.

I claim:

1. A high pressure nozzle comprising an elongated body having a liquid passage therethrough, a baffle pivotally mounted on one end of said body about an axis transverse of and laterally off-set from said passage, a sleeve unit rotatably carried by and encircling one end of said body and having a screw threaded connection with said body, said sleeve unit having a circumferential inner groove and including an enlarged mouth element projecting beyond said body and having an outwardly flaring mouth opening receiving said baffle, and means projecting laterally from said baffle and fitting in said groove for tilting said baffle upon rotation of said sleeve relative to said body, said baffle having a liquid-diverting surface corresponding in shape to that of a longitudinally divided cone.

2. A high pressure nozzle comprising a body having a liquid passage therethrough and a longitudinal slot at one end portion thereof, a baffle pivoted on said body about an axis transverse thereof and projecting outwardly therefrom, a tongue projecting laterally from said baffle and shiftable in said slot, and a sleeve unit rotatably encircling the end of said body and having a threaded engagement with said body, said sleeve unit having an annular internal recess receiving the end of said tongue and terminating in a projecting discharge portion receiving said baffle.

3. A high pressure nozzle comprising a body having a liquid passage therethrough, a sleeve unit rotatably encircling the end portion of said body and projecting therefrom, said sleeve unit having a threaded connection with the end of said body and having an annular internal groove therein, said unit terminating in an enlarged discharge portion having an outwardly flaring mouth opening, a baffle tiltably carried by said body and projecting into said flaring discharge opening, and a laterally projecting tongue carried by said baffle and seating in said groove.

4. A high pressure nozzle comprising a body having a liquid passage therethrough, a sleeve unit rotatably encircling the end portion of said body and projecting therefrom, said sleeve unit having a screw threaded connection with the end of said body and having an annular internal groove therein, said unit terminating in an enlarged discharged portion having an outwardly flaring mouth opening, a baffle tiltably carried by said body and projecting into said flaring discharge opening, and a laterally projecting tongue carried by said baffle and seating in said groove, said baffle being of substantially semi-conical form and being positioned with its tilting axis transverse of and spaced from the axis of said passage and with its convex surface facing the axis of said passage.

5. A high pressure nozzle comprising a body having a liquid passage therethrough, a sleeve rotatably encircling one end portion of said body and projecting therebeyond, said sleeve having an internal circumferential groove and the outer end of said sleeve having a flaring mouth opening, an annular socket member carried by the end of said body within said sleeve and having a screw threaded connection with said sleeve, a baffle transversely pivoted to said socket laterally off-set from said passage and including a lateral projection seating in said groove, rotation of said sleeve longitudinally shifting said sleeve to tilt said baffle.

6. A high pressure liquid nozzle comprising a body having a passage for liquid under high pressure, a sleeve threaded on said body and having an enlarged flaring mouth projecting beyond said body, said body and sleeve comprising a pair of relatively longitudinally shiftable parts, and a baffle pivoted to one of said parts transversely of and off-set laterally of said passage, said baffle having a laterally projecting portion seating in a circumferential groove in the other part, and comprising a tapering body of substantially semi-conical form, said baffle being tiltable in said mouth between a position angularly disposed across the mouth of said passage and a position laterally off-set from said passage.

LESLIE L. TIRRELL.